Patented Aug. 4, 1925.

1,548,493

UNITED STATES PATENT OFFICE.

LIVINGSTON A. THOMPSON, OF WAUKESHA, WISCONSIN.

FOOD PRODUCT.

No Drawing.   Application filed August 30, 1924.   Serial No. 735,220.

*To all whom it may concern:*

Be it known that I, LIVINGSTON A. THOMPSON, a citizen of the United States, and resident of Waukesha, in the county of Waukesha and State of Wisconsin, have invented certain new and useful Improvements in Food Products; and I do hereby declare that the following is a full, clear, and exact description thereof.

This invention relates to food products adapted for use particularly as a modifier of milk for infant feeding, of which the following is a specification.

The object of this invention is to provide a food substance which, when used to modify milk for the artificial feeding of infants and children will add the proper carbohydrates, make up the deficiency of readily assimilable iron compounds, add readily digestible protein, and modify the physical properties of the milk so as to inhibit the formation of solid, rubbery, indigestible masses of curd in the stomach during the coagulation of the milk casein.

The improved food product of this invention is a dry substance readily pulverizable, soluble in milk or in water and is used in modifying milk by merely adding to cow's milk (or other milk) and dissolving therein, or by dissolving the product in water and feeding the resulting solution in conjunction with milk. The product when so used accomplishes its purpose of completely modifying cow's milk in the following manner:—

1. By furnishing the necessary readily assimilable sugars in the form of socalled malt-sugars.

2. By making up the deficiency of assimilable organic iron compounds in the milk, provided organic iron has been incorporated.

3. By adding valuable protein matter in the form of edible gelatine thus lowing the ratio of casein to total protein in the modified milk thus making the substance more comparable with human milk.

4. By furnishing dextrins and gelatine in a colloidally dispersed state, in which state both exert a marked protective colloid influence in preventing the formation of indigestible curds during the coagulation of the milk casein in the stomach.

The product of this invention results from the combination of suitable proportions of malt-sugars, and gelatine with or without the addition of hemoglobin, predigested blood, or other source of organically combined iron of a readily assimilable nature, or of milk in any form, or of the carbonate, bicarbonate or chloride of either sodium or potassium or of the oxide or hydroxide of calcium.

In practising this invention the product is prepared commercially by mashing any cereal or its flour or the starch of any cereal or similar material with an active malt which is preferably, although not necessarily, barley malt. This mashing is done in water under well known conditions of dilution and temperature and for such a time as to secure complete and proper conversion of the starch to malt sugars, of which a portion remains as dextrine. Thereafter, the mash is allowed to stand and the clear solution is drawn off. To this clear body a solution of gelatine in water preferably together with an assimilable organically combined iron compound, is added. Further than this, a solution of carbonate, bicarbonate or chloride of sodium or potassium or oxide or hydroxide of calcium is added. After thorough mixing has taken place, the solution is evaporated under vacuum as, for instance by means of vacuum pans or similar apparatus to a dry state in which the resulting dry material contains not more than eight per cent of moisture.

The resulting dry material may be most readily pulverized and may be sold and used in this condition as a food product and modifier of milk.

As an example of the actual proportions used in preparing this food product, approximately eight hundred pounds of flour or starch may be mixed with sixteen hundred pounds of barley malt. This mixture is added to water in the proportion of one part to ten parts of water or until the mixture is freely fluid and sufficient water has been added for a proper reaction. About three percent by weight of gelatine is added, together with three percent by weight of predigested blood. Thereafter, the carbonate, bicarbonate, or chloride, (or a mixture of these) of potassium or sodium to the extent of about one percent is added. In place of these salts of potassium or sodium either the hydroxide or the oxide of calcium to the extent of approximately one percent may be added.

These proportions are given merely as illustrative of a practical example of the relative amounts of the different substances, and may of course be varied without departing from the spirit of this invention.

It will be seen, therefore, that a food product has been provided and a method of making such product which is highly useful as a food for infants and other people, which will effectively modify milk, which will prevent the formation of curds in the stomach during the coagulation period of the milk, and which supplies the necessary organically combined iron which is readily assimilable together with other highly desirable salts.

I claim:

1. A food product adapted to modify milk by inhibiting undesirable coagulation of milk during digestion, said product comprising a combination of gelatine and a maltose-dextrine mixture in colloidal form.

2. A food product adapted to modify milk by inhibiting undesirable coagulation of milk during digestion, said product comprising a combination of gelatine and a maltose-dextrine mixture in colloidal form, and readily assimilable organically combined iron.

3. A food product adapted to modify and supplement milk, said food product comprising gelatine, a maltose-dextrine mixture, a salt of an alkaline metal, and readily assimilable organically combined iron.

4. A dry powder food product for modifying and supplementing milk comprising a maltose-dextrine mixture combined with highly dispersed gelatine, said product passing readily into colloidal solution without soaking when mixed with either water or milk.

5. The method of making a food product for modifying milk comprising mashing a cereal flour with active malt in water, allowing conversion into malt sugars, drawing off the liquid, adding gelatine and evaporating in vacuum.

6. The method of making a food product for modifying and supplementing the action of milk comprising mashing a cereal flour with an active malt in water, allowing conversion into malt sugars, drawing off the liquid, adding to the liquid gelatine dissolved in water, adding the salt of an alkaline metal and organically combined iron, evaporating to dryness in vacuum, and powdering the dry mass.

In testimony that I claim the foregoing I have hereunto set my hand at Waukesha, in the county of Waukesha and State of Wisconsin.

LIVINGSTON A. THOMPSON.